(12) United States Patent
Emmerling et al.

(10) Patent No.: US 6,924,738 B2
(45) Date of Patent: Aug. 2, 2005

(54) METHOD FOR LOCATING A TRANSMITTER AND RECEIVER DEVICE

(75) Inventors: Ulrich Emmerling, Kelheim (DE); Matthias Reble, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 62 days.

(21) Appl. No.: 10/422,313

(22) Filed: Apr. 24, 2003

(65) Prior Publication Data

US 2003/0216124 A1 Nov. 20, 2003

(30) Foreign Application Priority Data

May 14, 2002 (DE) .......................................... 102 21 427

(51) Int. Cl.[7] .............................. G08B 26/00; G08B 1/08
(52) U.S. Cl. .............. 340/505; 340/539.21; 340/539.32
(58) Field of Search ....................... 340/539.21, 539.23, 340/825.36, 825.49, 539.32, 505

(56) References Cited

U.S. PATENT DOCUMENTS 5,289,163 A * 2/1994 Perez et al. ............ 340/539.32
5,677,673 A * 10/1997 Kipnis ................... 340/539.32
5,680,105 A * 10/1997 Hedrick ...................... 340/571
5,796,338 A * 8/1998 Mardirossian .............. 340/571

FOREIGN PATENT DOCUMENTS

DE          43 30 118 C1    1/1995
DE          198 61 116 C2   5/2002

* cited by examiner

Primary Examiner—Donnie L. Crosland
(74) Attorney, Agent, or Firm—Baker Botts L.L.P.

(57) ABSTRACT

A method, and a device for its implementation, for locating a transmitter and receiver device, are provided. At least one first transmitter and receiver device transmits a request with a predetermined transmission power, this request is received by at least one second transmitter and receiver device with a predetermined receiving power and after successful receipt the second transmitter and receiver device, of which there is at least one, transmits a response signal, with the response signal only being transmitted if the field strength of the transmitted signal in the position of the second transmitter and receiver device exceeds a specific threshold value or is within a threshold range and the threshold value or threshold range is predetermined by the first transmitter and receiver device by transmission to the second transmitter and receiver device.

21 Claims, 2 Drawing Sheets

METHOD FOR LOCATING A TRANSMITTER AND RECEIVER DEVICE

PRIORITY

This application claims foreign priority of the German application DE 10221427.1 filed on May 14, 2002.

BACKGROUND OF THE INVENTION

The invention relates to a method for locating a transmitter and receiver device, as used for example in automotive engineering for passive access control.

An operator for example carries a transmitter and receiver device, possibly in the form of an ID unit such as a key, a key tag, a smartcard, a chipcard, a timepiece, a remote control device or an implant, etc on or in proximity to their person.

This ID unit preferably causes specific actions, such as for example "open" or "lock the door locking system", "release" or "lock antitheft device", "start engine", etc. to be executed without any further button operation but simply by proximity to a vehicle.

As the actions depend on and distinguish the degree of proximity, in particular "person inside vehicle" or "still outside vehicle within a certain range", it is desirable to locate the position of the ID unit and therefore the person in relation to the vehicle. A transmitter and receiver device located inside the vehicle, in the form of a base station with a plurality of inductive antennas, is generally used for this, so that the position of the ID unit can be determined from the base station when received by a specific antenna (due to differing coverage).

The base station or control device sends out a number of successive requests via the different inductive antennas, which are generally integrated at different locations, and identifies the position of the ID unit, depending on the antenna by which the response signal of the ID unit was received.

The housing of a number of antennas at different positions in the vehicle, such as for example doors, rear windshield, vehicle roof lining, etc. is however disadvantageously complex and cost-intensive during vehicle manufacture and when fitted at a later date. Also transmitting at different powers is disadvantageously expensive with regard to the necessary hardware in the control device.

SUMMARY OF THE INVENTION

The object of the invention is therefore to create a method for locating a transmitter and receiver device, which overcomes the above disadvantages and allows problem-free location of a transmitter and receiver device with a simple structure and at low cost.

This object can be achieved by a method for locating a transmitter and receiver device, comprising the steps:
 a) transmitting a request by at least one first transmitter and receiver device with a predetermined transmission power,
 b) receiving said request by at least one second transmitter and receiver device with a predetermined receiving power,
 c) transmitting a response signal only after successful receipt by the at least second transmitter and receiver device and only if the field strength of the transmitted signal exceeds a specific threshold in the position of the second transmitter and receiver device or is within a threshold range and
 d) only if the threshold value or threshold range of the first transmitter and receiver device has been transmitted to the second transmitter and receiver device.

The object can also be achieved by a method for locating a transmitter and receiver device, comprising the steps:
 a) transmitting a request by at least one first transmitter and receiver device with a predetermined transmission power wherein the request includes data about the transmission power,
 b) receiving said request by at least one second transmitter and receiver device,
 c) determining the transmission power of the first transmitter and receiver device by the second transmitter and receiver device,
 d) transmitting a response signal by the second transmitter and receiver device only if the determined transmission power exceeds a specific threshold in the position of the second transmitter and receiver device, wherein the threshold is determined by the transmitted data about the transmission power.

A predetermined action can be executed by means of a control and/or analysis device depending on the receipt of the response by the first transmitter and receiver device. The threshold value or threshold range can be transmitted before or at the start of the request and can be set in the second transmitter and receiver device, so that further receipt of the request takes place with the correspondingly set reception sensitivity. The threshold value or threshold range can be transmitted before, at the start, at the end or after the request and is compared in the second transmitter and receiver device with the measured transmission field strength. The first transmitter and receiver device may send a request with constant transmission power. The first transmitter and receiver device can be located in the interior of a vehicle and transmits requests with a threshold value which corresponds to the field strength of the field line for an interior or for an exterior of the vehicle.

Furthermore, the object can be achieved by a device for locating a transmitter and receiver device, comprising at least one first transmitter and receiver device for transmitting a request with a predetermined transmission power, and a second transmitter and receiver device for communication with has means for determining the receiving power. The means for determining the receiving power may comprise at least two adjustable threshold values with predetermined receiving power. The means for determining the receiving power may also comprise a measurement device, to measure the transmission field strength of the transmitted signal in the position of the second transmitter and receiver device. The first transmitter and receiver device can be located in the interior of a vehicle and transmits requests with a threshold value which corresponds to the field strength of the field line for an interior or for an exterior of the vehicle.

Unlike the conventional prior art, with the method according to the invention the location of a transmitter and receiver device, in particular a portable ID unit, is generated not by the differing, successive variation of a transmission field but by a "send response" action of the transmitter and receiver device to be located, which depends on the field strength of the transmitted signal of the first transmitter and receiver device, in particular the base station.

In an embodiment of the invention the receiving power or reception sensitivity is switched in the transmitter and receiver device to be located, with the transmission power for example remaining constant. According to the invention the transmitter and receiver device receives the first part of a request signal transmitted by a first transmitter and receiver device, in particular a base station or control device, with a predetermined receiving power and this first part contains information about a receiving power to be set in the second transmitter and receiver device (to be located).

After setting the required receiving power, a response is only sent to the second transmitter and receiver device if further subsequent information, for example the remainder of a transmitted message, continues to be received successfully. This response is in turn received by the first transmitter and receiver device so that according to this method the position of the second transmitter and receiver device, in particular the portable ID unit, and therefore also advantageously the position of a person carrying such an ID unit about their person, can be determined.

By setting a specific receiving power or reception sensitivity or a range (within two threshold values) the action "send response" is triggered in the second transmitter and receiver device depending on the field strength of the transmitted signal from the first transmitter and receiver device, as the field strength of the transmission power is known to decrease with distance and a signal can be received at a specific position with a specific field strength only with a specific minimum reception sensitivity or range.

The setting of a predetermined, requested or required receiving power can be transmitted as information in the first part of a sent signal, for example as a (transmitter) message header or function code, so that the second transmitter and receiver device thereafter receives at the correspondingly set receiving power.

In this way, with a corresponding transmitted signal power and a reception sensitivity selected on this basis, a distinction can be made or a location operation carried out to establish whether a second transmitter and receiver device is located within or outside a specific range (around the first transmitter and receiver device), for example in the interior of a vehicle.

In a different embodiment of the invention the received field strength of the transmitted signal from the first transmitter and receiver device, which depends on its position in the transmission field, is measured and a response is only sent if the field strength has exceeded a specific threshold value or is within a specific range.

The threshold value or range can in turn be contained in the first part of the sent signal, for example in a function code, or even be transmitted before or after the actual information part of the transmitted signal, or before or after the sent signal.

According to this embodiment too a response is subsequently only sent from the second transmitter and receiver device, if the field strength of the transmitted signal is above a required value or within a required range.

According to the principle of the invention it is advantageously no longer necessary to locate a plurality of antennas in a vehicle, the sole purpose of which is not to extend and thereby enlarge a transmission field but to locate a transmitter and receiver device according to the principle of direction finding.

Instead successful location is achieved without variation of the transmission field (in power and/or direction) by means of a procedure which is dependent on the field strength of the transmission field at the site of the second transmitter and receiver device (response dependent on successful receipt with the required reception sensitivity set or depending on a positive comparison of the measured field strength with a required threshold value) in the second transmitter and receiver device.

Depending on this procedure and therefore on the relative position of the first transmitter and receiver device in relation to the second, an action such as unlock/lock the immobilizer, open/close the central locking system, switch the interior lighting on/off, release/lock engine starter, etc. can advantageously be controlled.

BRIEF DESCRIPTION OF THE DRAWINGS

Further advantageous embodiments of the invention emerge from the dependent claims.

The invention is described below on the basis of an embodiment shown in the drawing. The drawing shows FIG. 1 an application of the method according to the invention in the area of passive access control for a motor vehicle with two different ranges to be located for an ID unit.

DETAILED DESCRIPTION OF THE PREFERRED EMBODIMENTS

Figure 1:
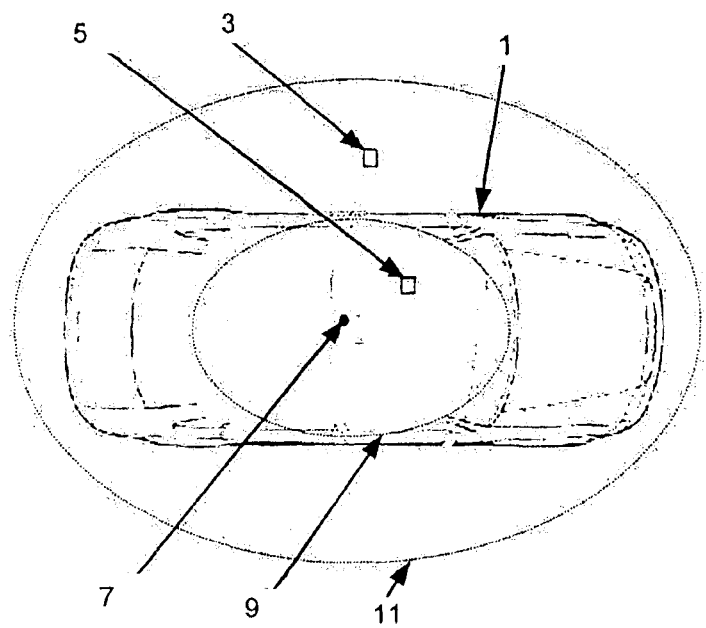

FIG. 1 shows how a first transmitter and receiver device located inside a vehicle 1, for example a motor car, in a stationary manner opens up a constant transmission field, in other words with no variation in transmission power, by means of a transmitter antenna in position 7, so that field lines of equal field strength are formed in a slight ellipse shape, for example due to corresponding characteristics of the transmitter antenna.

This ellipse shape of the field lines, as shown below, advantageously means that both the interior and exterior can be monitored efficiently even with a single antenna.

As shown in FIG. 1, in this embodiment a field line 9 with a higher level of predetermined constant field strength, which covers the interior of the vehicle, and a field line 11 with a correspondingly lower level of field strength, which surrounds the vehicle at a predetermined distance of for example approx. 0.5 to 3 meters from the external dimensions of the vehicle, are of particular interest.

If a second transmitter and receiver device, in particular an ID unit or a transponder, which is generally carried on the person of an operator, is now located in range of the interior, for example in position 5, this position can be distinguished from a position outside the interior (but within the exterior), for example in position 3, and therefore the position of the transponder can be located in relation to the first transmitter and receiver device or the control device.

Figure 2:
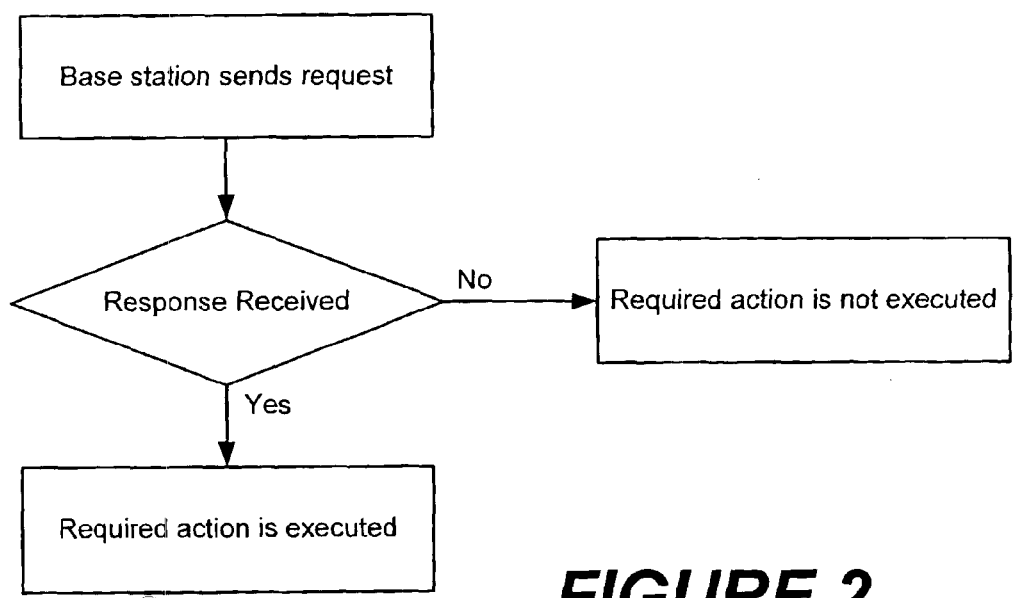
FIG. 2 a flow chart of the method according to the invention in a (first) transmitter and receiver device located in a vehicle and FIG. 3 a flow chart of the method according to the invention in an application according to FIG. 1 and FIG. 2 in a (second) transmitter and receiver device to be located.

For this purpose the control device or the base station in the vehicle 1 transmits a request via its transmitter antenna in position 7, as shown in FIG. 2, for example relating to the action "start engine". If the control device receives a corresponding positive response from the transponder, the required action is executed, for example via a control and/or analysis device. If no response is received to the request from the control device, the required action is naturally not executed.

Figure 3:
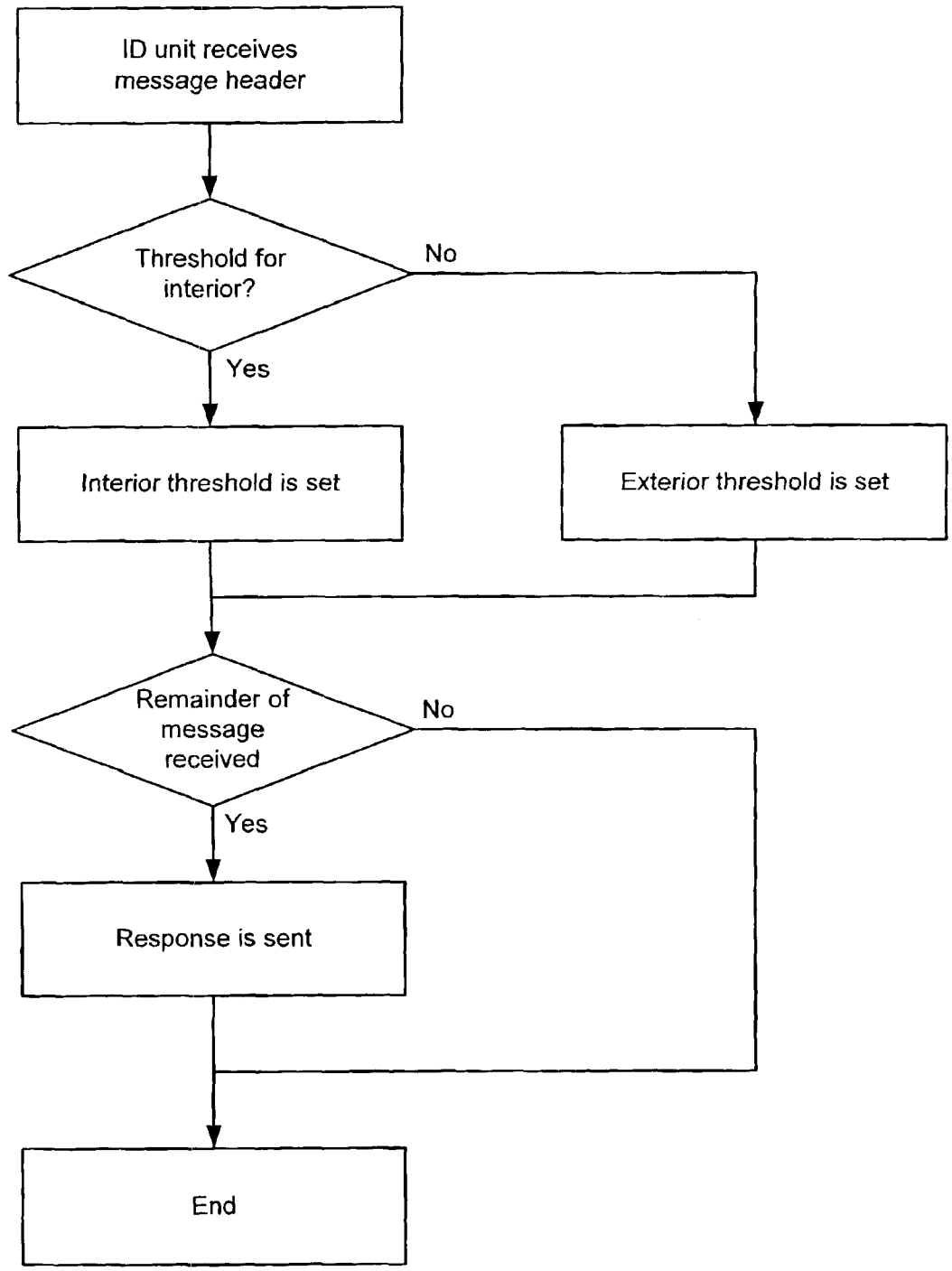

For this purpose the sequence of the method according to the invention as shown in FIG. 3 is executed in the ID unit or transponder. At the start of the transmission the transponder receives the first part of the request, for example in the (transmitted) message header or in the function code, determines whether this first part specifies a threshold for the interior for example in the form of corresponding information relating to the sensitivity of the receiving power and sets this threshold for receiving power or reception sensitivity, in so far as such setting is required.

An attempt is then made with the threshold correspondingly set to receive the remaining subsequent information in the request and, only in the event of a positive result, to send back a corresponding (successful) response, with corresponding, for example constant, adequate transmission power.

If the operator with the transponder is now in position 5, in other words within the interior, the remainder of the request is also received with the interior threshold set and a corresponding reply is sent, which is in turn received by the control device in the vehicle. The transponder is therefore located "in the interior" so that a corresponding action, for example "release engine starter", "release immobilizer" can be executed.

If however the person with the transponder were outside the vehicle for the request for an interior-specific action such as "start engine", "release immobilizer", etc., and only within the exterior area, for example in position 3, the remainder of the request signal could not be received with the correspondingly set exterior threshold, so that a corresponding response would not be sent back. In the absence of a response in the control device, the requested interior-specific action is not executed.

Then for example in a regular exchange and/or on request (e.g. activation of door handle, etc.) a request for an exterior-specific action, such as for example "unlock the door locking system", "switch on the interior light", etc. can be executed via a corresponding request or a first part containing the information required to set a threshold for the exterior. With the corresponding proximity of an operator with an ID unit to the vehicle, the remainder of the information in the request is received, a corresponding response is sent back and received by the control device so that the corresponding exterior-specific action can be executed.

With proximity, in other words when the operator is less than a specific distance from the vehicle of for example 2 meters, or on request, the central locking system is released in this way and the interior light may also be switched on and when the operator moves further into the interior of the vehicle, the antitheft device or immobilizer is released and the engine start operation is executed or released.

Conversely of course, when leaving the interior, and going on to leave the exterior, the corresponding specific actions can be negated, in other words "lock the immobilizer", when leaving the interior and when leaving the exterior "lock the central locking system", "switch off the interior light", etc.

In order to ensure receipt within a predetermined exterior, even if a required threshold has not been transmitted, the ID unit can receive with a predetermined basic receiving power. This basic receiving power may be identical to the threshold for the exterior or more sensitive (i.e. lower).

If a second item of information is not received, this threshold for sensitivity can be automatically reset. However even in the event of successful communication with the interior threshold set, it is possible at the end of a predetermined time interval (or by reset signal at the end of a transmitted message) for this basic receiving power to be automatically reset in the ID unit, in order to execute further requests correctly in any event.

Instead of as described in the embodiment, the position of a second transmitter and receiver device can be located in relation to a first transmitter and receiver device also by measuring the field strength in the second transmitter and receiver device, in particular in the ID unit. If the measurement result corresponds to a required threshold transmitted before or afterwards, or is within a required range, the positive result can be transmitted by means of a corresponding (successful) response to the base station. With this embodiment too corresponding actions can be executed on the basis of the relative positions of the ID unit and the base station.

Naturally the invention is not restricted to the embodiment shown but can be extended to the widest variety of areas, in which actions depend on the location of a transmitter and receiver device. In this way house access doors, garage doors, cupboards, safes, cash machines can also be provided with different authentication and authorization stages so that specific actions can be executed depending on the degree of proximity.

What is claimed is:

1. A method for locating a transmitter and receiver device, comprising the steps:
   a) transmitting a request signal by at least one first transmitter and receiver device with a predetermined transmission power,
   b) receiving said request signal by at least one second transmitter and receiver device with a predetermined receiving power,
   c) transmitting a response signal only after successful receipt of the request signal by the at least one second transmitter and receiver device and only if a field strength of the transmitted signal exceeds a specific threshold value in a position of the second transmitter and receiver device or is within a threshold value range, and
   d) only if the threshold value or threshold value range of the first transmitter and receiver device has been transmitted to the second transmitter and receiver device.

2. A method according to claim 1, wherein a predetermined action is executed by means of a control and/or analysis device depending on the receipt of the response signal by the first transmitter and receiver device.

3. A method according to claim 1, wherein the threshold value or threshold range is transmitted before or at the start of the request signal and is set in the second transmitter and receiver device, so that further receipt of the request signal takes place with a correspondingly set reception sensitivity.

4. A method according to claim 1, wherein the threshold value or threshold range is transmitted before, at the start, at the end or after the request signal and is compared in the second transmitter and receiver device with the measured transmission field strength.

5. A method according to claim 1, wherein the first transmitter and receiver device sends a request signal with constant transmission power.

6. A method according to claim 1, wherein the first transmitter and receiver device is located in the interior of a vehicle and transmits request signals with a threshold value which corresponds to a field strength of the field line for an interior or for an exterior of the vehicle.

7. A method according to claim 1, further comprising selecting the predetermined transmission power and the predetermined receiving power to establish if the second transmitter and receiver device is located within or outside a specific range around the first transmitter and receiver device.

8. A device for locating a transmitter and receiver device, comprising:
- at least one first transmitter and receiver device for transmitting a request signal with a predetermined transmission power, and
- a second transmitter and receiver device for communication with said first transmitter and receiver device having means for determining receiving power to establish whether the second transmitter and receiver device is located within a specific range of the first transmitter and receiver device.

9. A device according to claim 8, wherein said means for determining the receiving power comprise at least two adjustable threshold values with predetermined receiving power.

10. A device according to claim 8, wherein said means for determining the receiving power comprise a measurement device, to measure a transmission field strength of a transmitted signal in a position of the second transmitter and receiver device.

11. A device according to claim 8, wherein the first transmitter and receiver device is located in the interior of a vehicle and transmits request signals with a threshold value which correspond to a field strength of a field line for an interior or for an exterior of the vehicle.

12. A method according to claim 8, further comprising a means to select the predetermined transmission power and the predetermined receiving power to establish if the second transmitter and receiver device is located within or outside a specific range around the first transmitter and receiver device.

13. A method for locating a transmitter and receiver device, comprising the steps:
- a) transmitting a request signal by at least one first transmitter and receiver device with a predetermined transmission power wherein the request signal includes data about the transmission power,
- b) receiving said request by at least one second transmitter and receiver device,
- c) determining the transmission power of the first transmitter and receiver device by the second transmitter and receiver device, and
- d) transmitting a response signal by the second transmitter and receiver device only if the determined transmission power exceeds a specific threshold signal value or threshold value range in a position of the second transmitter and receiver device, wherein the threshold value or threshold value range is determined by the transmitted transmission power data.

14. A method according to claim 13, wherein a predetermined action is executed depending on the receipt of the response signal from the second transmitter and receiver device by the first transmitter and receiver device.

15. A method according to claim 13, wherein the threshold value or threshold value range is transmitted before the start of the request signal and is set in the second transmitter and receiver device, so that further receipt of the request signal takes place with a correspondingly set reception sensitivity.

16. A method according to claim 13, wherein the threshold value or threshold value range is transmitted at the start of the request signal and is set in the second transmitter and receiver device, so that further receipt of the request takes place with a correspondingly set reception sensitivity.

17. A method according to claim 13, wherein the threshold value or threshold value range is transmitted at the end of the request signal and is compared in the second transmitter and receiver device with a measured transmission field strength.

18. A method according to claim 13, wherein the threshold value or threshold range is transmitted after the request signal and is compared in the second transmitter and receiver device with a measured transmission field strength.

19. A method according to claim 13, wherein the first transmitter and receiver device sends a request signal with constant transmission power.

20. A method according to claim 13, wherein the first transmitter and receiver device is located in the interior of a vehicle and transmits request signals with a threshold value which corresponds to the field strength of a field line for an interior or for an exterior of the vehicle.

21. A method according to claim 13, further comprising selecting the predetermined transmission power and the predetermined receiving power to establish if the second transmitter and receiver device is located within or outside a specific range around the first transmitter and receiver device.

* * * * *

UNITED STATES PATENT AND TRADEMARK OFFICE
CERTIFICATE OF CORRECTION

PATENT NO. : 6,924,738 B2
DATED : August 2, 2005
INVENTOR(S) : Ulrich Emmerling and Mathias Reble It is certified that error appears in the above-identified patent and that said Letters Patent is hereby corrected as shown below:

<u>Title page,</u>
Item [75], Inventors, delete "Matthias Reble" and replace with -- Mathias Reble --.

Signed and Sealed this

Seventeenth Day of January, 2006

JON W. DUDAS
*Director of the United States Patent and Trademark Office*